April 22, 1952 — W. L. HARBAUGH — 2,593,558
FLUID CONTROL VALVE
Filed Jan. 28, 1948 — 2 SHEETS—SHEET 1
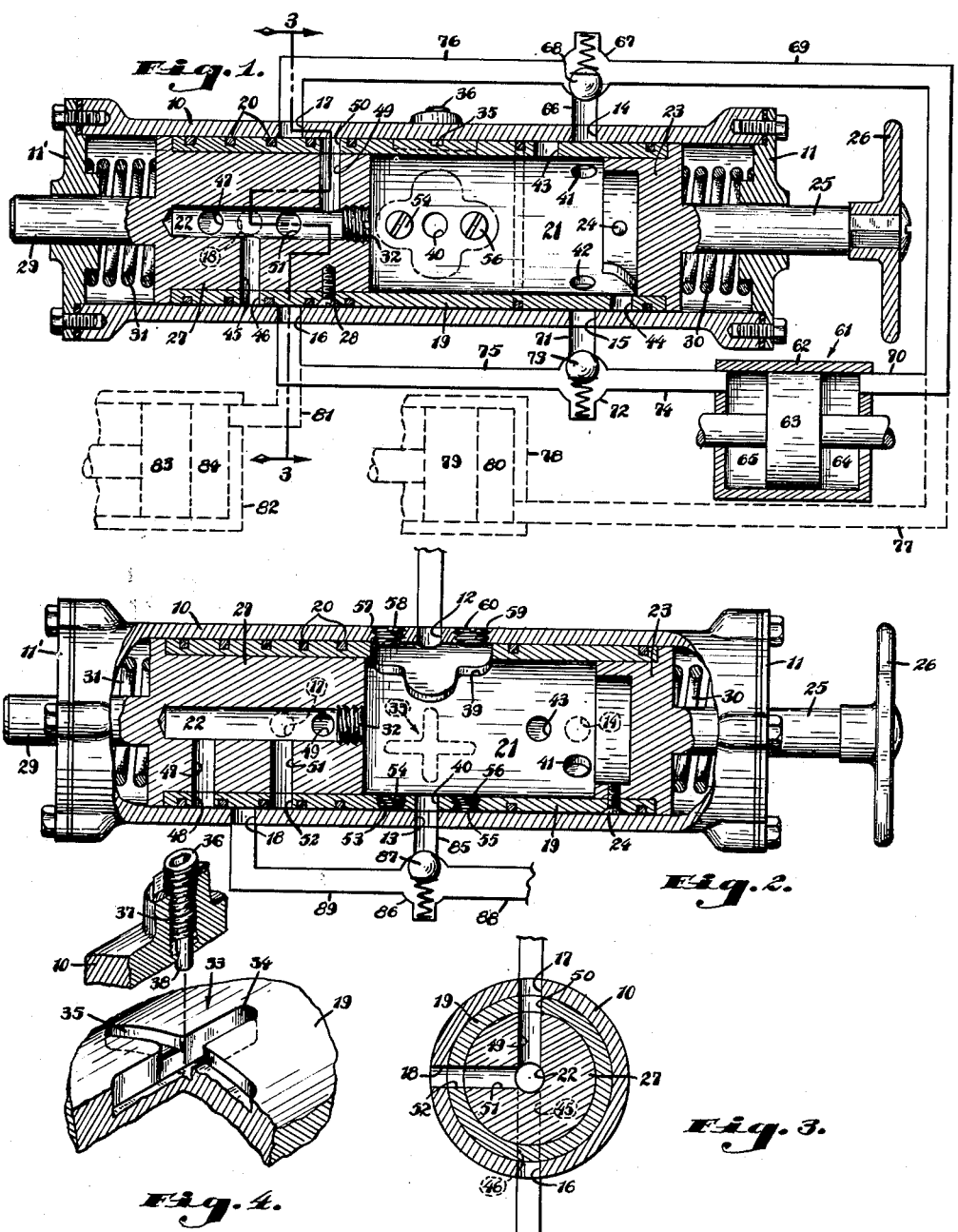
INVENTOR.
WALTER L. HARBAUGH,
BY: Harold B. Hood.
ATTORNEY.

April 22, 1952 W. L. HARBAUGH 2,593,558
FLUID CONTROL VALVE
Filed Jan. 28, 1948 2 SHEETS—SHEET 2
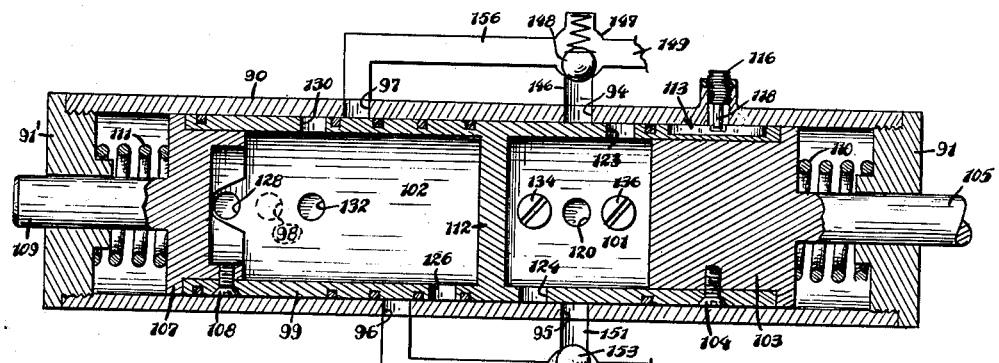
Fig. 5.
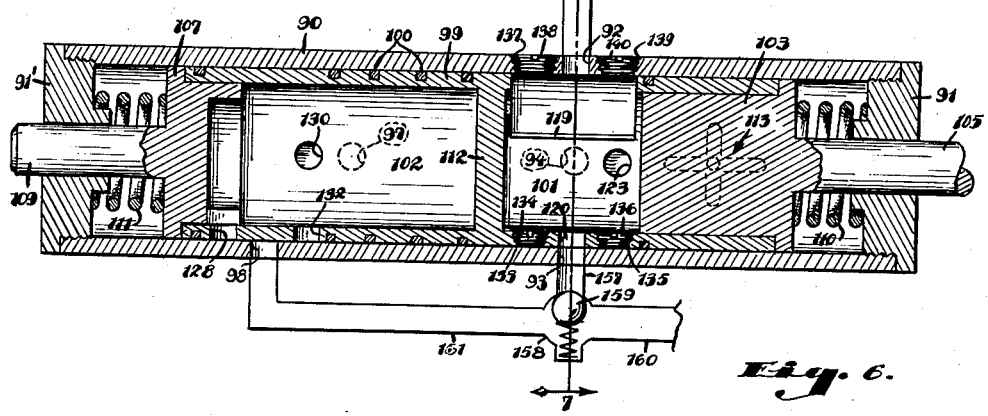
Fig. 6.
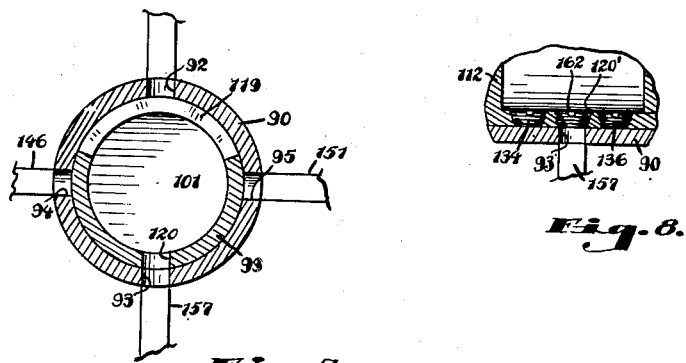
Fig. 7.
Fig. 8.
INVENTOR.
WALTER L. HARBAUGH,
BY:
Harold B. Hood.
ATTORNEY.

Patented Apr. 22, 1952

2,593,558

UNITED STATES PATENT OFFICE 2,593,558

FLUID CONTROL VALVE

Walter L. Harbaugh, Indianapolis, Ind.

Application January 28, 1948, Serial No. 4,841

12 Claims. (Cl. 251—76)

The present invention relates to a fluid control valve, and is particularly concerned with the provision of valve mechanism adapted and intended for the control of fluid motors. More particularly, it is an object of my invention to provide a valve mechanism of such character that it may be alternatively applied to control a fluid motor of the double acting piston type, or to control a plurality of separate fluid motors of the single acting piston type, and so constructed that complete control of the motor can be effected through manipulation of a single operating element. A further object of the invention is to provide a device of the character described capable of use in controlling the flow of pressure fluid to and from one or more fluid motors, in an organization in which the fluid under pressure is continuously supplied by a continuously operating pump, without the interposition of a pressure tank. A still further object of the invention is to provide a device of the character described which is capable, through a simple adjustment, of being converted for use in a maintained-pressure system.

Further objects of the invention will appear as the description proceeds.

To the accomplishment of the above and related objects, my invention may be embodied in the forms illustrated and described in the accompanying drawings, attention being called to the fact, however, that the drawings are illustrative only, and that change may be made in the specific constructions illustrated and described, so long as the scope of the appended claims is not violated.

Fig. 1 is a horizontal longitudinal section through one form of valve embodying my invention, together with a diagrammatic illustration of the connections between the illustrated valve mechanism and fluid motors to be controlled thereby;

Fig. 2 is a vertical longitudinal section through the embodiment of my invention illustrated in Fig. 1;

Fig. 3 is a transverse section taken upon the several planes indicated by the section line 3—3 in Fig. 1;

Fig. 4 is an enlarged, fragmental perspective exploded view of the elements of a movement-limiting device embodied in my invention;

Fig. 5 is a central horizontal section through a modified form of valve mechanism embodying my invention;

Fig. 6 is a vertical longitudinal section therethrough;

Fig. 7 is a transverse section taken substantially on the line 7—7 of Fig. 6; and Fig. 8 is a fragmental section in the plane of Fig. 6, showing means for converting the valve for use in a maintained-pressure system.

Referring more particularly to the drawings, it will be seen that the embodiment of my invention illustrated in Figs. 1 to 4, inclusive, comprises a substantially cylindrical housing 10 provided, at its opposite ends, with removably secured abutment members 11 and 11'. The housing is provided with an inlet port 12 and an exhaust port 13 which, in the illustrated embodiment of the invention, is peripherally spaced from the inlet port 12 by 180 degrees, but axially aligned with said port.

The housing 10 is further provided, at points axially spaced from the inlet and exhaust ports 12 and 13, with an outlet port 14 and an outlet port 15 which, in the illustrated embodiment of the invention, are 180 degrees peripherally spaced from each other, and axially aligned.

At points oppositely spaced axially from the inlet and exhaust ports 12 and 13, the housing is provided with a further pair of ports 16 and 17 which are 180 degrees peripherally spaced from each other, and axially aligned. A second exhaust port 18 is provided in the housing 10 at a point 90 degrees removed from the ports 16 and 17 and axially spaced from the plane containing the axes of the ports 12 and 13 farther than are the ports 16 and 17. In the illustrated embodiment of the invention, the port 18 is peripherally aligned with the port 13.

Reciprocably and oscillably mounted in the housing 10 is a cylindrical valve 19 which snugly fits the internal surface of the housing and is preferably provided with sealing rings 20 so spaced as to guard against axial seepage of fluid between the valve and the housing, in any permissible position of the valve. The valve is formed to provide two axially spaced, non-communicating chambers 21 and 22. One end of the chamber 21 is closed by a plug 23, secured in place by one or more screws 24, or the like, and provided with an axially projecting stem 25 which is journalled in the abutment element 11, projects therethrough, and, beyond said element, carries a manipulating handle 26.

The other end of the valve is closed by a block 27, in which is formed the chamber 22, said block being secured in the valve by means of one or more screws 28, and having a stem 29 guided for movement in the abutment element 11'. A coiled spring 30 is confined between the block 23 and the abutment 11, and a coiled spring 31 is confined between the block 27 and the abutment 11', said springs cooperating to hold the valve 19 resiliently in its illustrated position relative to the length of the housing 10.

The chamber 22 is in the block 27 may comprise, as in the illustrated embodiment, an axial bore opening through the inner end of the block, the open end of the bore being closed by a removable, threaded plug 32.

For reasons which will appear, it is essential to provide means for limiting the reciprocation or oscillation of the valve in the housing, such means being of such character as to permit either reciprocation or oscillation, in either direction, from a neutral position of the valve, but to prevent reciprocation when the valve has been oscillated in either direction from its neutral position, and to prevent oscillation when the valve has been reciprocably shifted in either direction from its neutral position. One such means is illustrated in detail in Fig. 4 and comprises a socket, indicated generally by the reference numeral 33, formed in the peripheral surface of the valve 19, said socket comprising a branch 34 elongated in the direction of the axis of the housing 10, and a branch 35 elongated in the direction of the periphery of the valve, said brances bisecting each other. For a reason which will appear hereinafter, the branch 34 is radially deeper than the branch 35. A screw 36 is threadedly mounted in a threaded, radial opening 37 in the housing 10, and has an unthreaded nose 38 which is adapted to be projected to varying degrees radially inwardly from the interior surface of the housing to engage in the socket 33.

The valve is formed with an inlet port 39 communicating with the chamber 21 and so positioned and proportioned as to register with the inlet port 12 of the housing in all positions which the valve is permitted, by the screw 36, to assume. The valve is further formed with a first exhaust port 40 opening from the chamber 21 and registering with the housing exhaust port 13 when, and only when, the valve is in its neutral position.

At points spaced, in the direction of the axis of the housing 10, from the inlet and exhaust ports, the valve is formed with two peripherally spaced outlet ports 41 and 42. When the valve is in its neutral position, the ports 41 and 42 are axially aligned with the housing outlet ports 14 and 15; but the ports 41 and 42 are peripherally spaced from each other and, when the valve is in its neutral position, from the ports 14 and 15. It will be clear that oscillation of the valve in a counter-clockwise direction, as viewed from the right hand end of Fig. 1, will move the port 41 into registry with the port 14; while clockwise oscillation thereof will move the port 42 into registry with the port 15.

At points oppositely spaced, in the direction of the axis of the housing 10, from the housing ports 14 and 15, but peripherally aligned with said housing ports, respectively, when the valve is in its neutral position, the valve is provided with an additional pair of outlet ports 43 and 44. It will be clear that, when the valve is shifted toward the right, as viewed in Fig. 1, from its neutral position, the port 43 will be moved into registry with the housing port 14; and when said valve is shifted toward the left from such neutral position, the port 44 will be brought into registry with the port 15.

A passage 45 extends radially from the chamber 22 through the block 27 and is always in registry with a port 46 formed in the valve 19. A passage 47, both axially and peripherally spaced from the passage 45, leads from the chamber 22 radially through the block 27 and is always in registry with a port 48 formed in the valve 19. A passage 49, axially spaced in the opposite direction from the passage 45, and, in the illustrated embodiment of the invention, 180 degrees peripherally spaced from the passage 45, leads from the chamber 22 radially through the block 27 and is always in registry with a port 50 in the valve 19. A passage 51, axially spaced but peripherally aligned with the passage 47, leads radially through the block 27 and is always in registry with a port 52 in the valve 19.

The ports 46 and 50 are spaced respectively oppositely, in the direction of the axis of the housing 10, from the housing ports 16 and 17, in amounts corresponding to the spacing of the ports 43 and 44 from the ports 14 and 15; but the ports 46 and 50 are peripherally aligned with the ports 16 and 17, when the valve is in its neutral position. Similarly, the ports 48 and 52 are axially spaced oppositely from the port 18 by amounts corresponding to the spacing of the ports 43 and 44 from the ports 14 and 15, but are peripherally aligned with the port 18 when the valve is in its neutral position. Thus, when the port 43 registers with the port 14, the port 46 will register with the port 16 and the port 48 will register with the port 18; and, correspondingly, when the port 44 registers with the port 15, the port 50 will register with the port 17 and the port 52 will register with the port 18.

The valve is formed with further ports 53 and 55 which, when the valve is in its neutral position, are oppositely spaced, in the direction of the axis of the housing 10, from the port 13, by amounts corresponding to the spacing of the ports 43 and 44 from the ports 14 and 15, but are peripherally aligned with said port 13. Threaded plugs 54 and 56 are removably seatable in the ports 53 and 55, respectively, to seal said ports against fluid flow, at times. In order to provide access to the plugs 54 and 56, the housing is formed, at points diametrically opposite the positions assumed by the plugs 54 and 56 when the valve is in neutral position, with openings 57 and 59 adapted to be closed by removable threaded plugs 58 and 60.

In Fig. 1, I have illustrated diagrammatically a fluid motor having a double acting piston, said motor being indicated generally by the reference numeral 61 and comprising a cylinder 62 in which is reciprocably mounted a piston 63 dividing the cylinder into oppositely variable-volume chambers 64 and 65. The flow circuits for operating the motor 61 are indicated somewhat diagrammatically in Fig. 1. A conduit 66 leads from the housing outlet port 14 to a branched fitting 67 incorporating a check valve 68 designed to permit flow through the conduit 66 away from the port 14, but to prevent flow through said conduit toward the port 14. From the fitting 67, a conduit 69 leads to a conduit 70 which opens into the chamber 64.

A conduit 71 leads from the housing outlet port 15 to a similar branched fitting 72 incorporating a check valve 73 which permits flow through the conduit 71 from the port 15 but prevents reverse flow therethrough. A conduit 74 provides communication between the chamber 65 and the fitting 72. A conduit 75 leads from the fitting 72 to the housing port 16, and a conduit 76 leads from the fitting 67 to the housing port 17.

When my control valve mechanism is connected to the motor 61, in the manner above described, and when the pressure flow from a continuously operating pump (not shown) is connected to the inlet port 12, it will be seen that, so long as the valve remains in a neutral position, pressure fluid will flow into the port 12, through the port 39 and into the chamber 21, and will thence be discharged through the ports 40 and 13, to return to the intake side of the pump. If, now, the valve is shifted toward the right to bring the port 43 into registry with the port 14, flow from the chamber 21 through the housing exhaust port 13 will be interrupted by reason of the fact that the valve exhaust port 40 is thereby moved out of registry with the housing exhaust port 13. Flow will therefore be from the chamber 21 through the ports 43 and 14 and the conduit 66 past the check valve 68 and through the conduits 69 and 70 to the chamber 64. Fluid cannot flow from the fitting 67 through the conduit 76, since the valve port 50 is out of registry with the housing port 17.

The stated adjustment of the valve 19 moves the port 46 into registry with the port 16 so that, as the piston 63 moves toward the left under the influence of fluid entering the chamber 64, fluid will be discharged from the chamber 65 through the conduits 74 and 75 and ports 16 and 46 and passage 45 into the chamber 22. The stated adjustment of the valve has moved the port 48 into registry with the port 18, so that the fluid entering the chamber 22 will be exhausted therefrom through the passage 47, port 48, and port 18.

Correspondingly, if the valve is moved from its neutral position toward the left to bring the port 44 into registry with the port 15, the port 40 is oppositely moved out of registry with the port 13. The port 50 registers with the port 17 and the port 52 registers with the port 18, whereby fluid will flow from the chamber 21 through the ports 44 and 15, the conduit 71, past the check valve 73, and through the conduit 74 into the chamber 65. Fluid cannot flow from the fitting 72 through the conduit 75, because the port 46 is out of registry with the port 16. As the piston 63 moves toward the right, fluid will flow from the chamber 64 through the conduits 70 and 69, the fitting 67, and the conduit 76, to and through the ports 17 and 50, the passage 49, the passage 51, and the ports 52 and 18 to exhaust.

The piston 63 may be stopped in any position of adjustment by returning the valve 19 to neutral position, wherein all ports communicating with the chambers 64 and 65 are blocked, and wherein continuous flow of fluid from the pressure source will be maintained through the inlet port 12, valve port 39, chamber 21, valve port 40, and exhaust port 13.

If it is desired to use the valve mechanism to control two single acting piston motors, a branch or continuation 77 of the conduit 69 will be connected to a cylinder 78 in which is reciprocably mounted a piston 79 defining a variable-volume chamber 80; and a branch or continuation 81 of the conduit 75 will be connected to a cylinder 82 in which is reciprocably mounted a piston 83 defining a variable-volume chamber 84. Now, the plugs 54 and 56 are removed from the ports 53 and 55.

With the valve in its neutral position all communication between the inlet and exhaust ports 12 and 13 and the chambers 80 and 84 is closed, and flow from the pressure source will be through the control mechanism back to the pressure source. It may here be stated that a conduit 85 connects the exhaust port 13 with a branched fitting 86 incorporating a check valve 87 which permits flow away from the port 13 but prevents flow toward said port. A conduit 88 connects the fitting 86 with the intake of the pump (not shown); and a conduit 89 provides communication between the port 18 and the fitting 86.

Now, if the valve 19 is oscillated to bring the port 41 into registry with the port 14, the port 40 will thereby be moved out of registry with the port 13, and fluid flow will be from the inlet 12 through the port 39 into the chamber 21 and thence through the port 41 and port 14 to and through the conduit 66, past the check valve 68, and through the conduits 69 and 77 to the chamber 80. When the port 41 is in registry with the port 14, all other ports in the organization, except the ports 12 and 39, are out of registry. When the valve 19 is returned to neutral position, the piston 79 and 83 will be held in adjusted positions.

If the valve is oscillated in the opposite direction to bring the port 42 into registry with the port 15, the piston 79 will be unaffected, but flow will be through the inlets 12 and 39 to the chamber 21 and thence through the ports 42 and 15 and through the conduit 71, past the check valve 73, and through the conduits 75 and 81 to the chamber 84. Return of the valve to neutral position will hold the piston 83 in its newly assumed position.

If, now, the valve is shifted toward the right to bring the port 43 into registry with the port 14, the port 53 will register with the port 13 and the port 48 will register with the port 18. Since fluid can flow from the chamber 21 through the ports 53 and 13 as rapidly as it enters said chamber through the ports 12 and 39, no fluid will be forced through the ports 43 and 14 past the check valve 68 to enter the chamber 80, and the piston 79 will be unaffected. However, such movement of the valve brings the port 46 into registry with the port 16 and the port 48 into registry with the port 18, thus exhausting the variable-volume chamber 84 to permit the piston 83 to move toward the right, as viewed in Fig. 1. Similarly, if the valve is shifted toward the left from its illustrated position, the ports 44 and 15 will register, the ports 55 and 13 will register, the ports 50 and 17 will register, and the ports 52 and 18 will register, to exhaust the variable-volume chamber 80, without affecting the piston 83.

The necessity for the movement-limiting means 33—38 now becomes apparent. Oscillation of the valve after reciprocation thereof from its neutral position, or reciprocation of the valve after oscillation thereof from its neutral position, would obviously destroy the essential relationship among the various ports of the valve and housing, to damage either the pump or the circulating system of conduits. Further, from the above description of operation, it will be perceived that, when the valve is connected to control a double acting motor such as 61, it must not be oscillated, all control being effected by reciprocation of the valve. Therefore, when the valve mechanism is connected to control a double acting motor such as 61, the screw 36 is projected inwardly until its nose 38 penetrates the socket branch 34 to a depth radially below the floor of the branch 35, thus positively holding the valve against oscillation, while limiting the degree of its reciprocation in opposite directions from neutral position. When, however, the valve mechanism is connected to control a plurality of single acting motors, such as 78 and 82, the screw 36 is retracted sufficiently so that its nose 38 will not project radially below the floor of the branch 35, whereby said screw cooperates with the socket 33 to limit both reciprocation and oscillation of the valve, while permitting either reciprocation or oscillation, in either direction, from a neutral position only of the valve.

In Figs. 5 to 7 I have disclosed a further, and in some respects preferable, form of valve mechanism coming within the scope of my invention. A cylindrical valve housing 90 is provided at its opposite ends with removable abutment elements 91 and 91'. A radial inlet port 92 and a radial exhaust port 93 are provided in the housing, and the housing is further provided with a pair of peripherally spaced outlet ports 94 and 95. In this form of the invention, the ports 92, 93, 94 and 95 may be axially aligned, by which I mean that the axes of the ports may be disposed in a common plane transverse to the housing 90. The housing is further formed, at points differently spaced from the above-mentioned plane, in the direction of the axis of the housing, with two further ports 96 and 97, peripherally spaced from each other. A second exhaust port 98, still differently axially spaced from the above-mentioned plane, may be peripherally aligned with the port 93, as shown.

A cylindrical valve 99 is reciprocably mounted in the housing 90, and is provided with rings 100 similar to the rings 20 of the previously described embodiment of my invention. The valve is formed to provide two non-communicating chambers 101 and 102 separated by a transverse wall 112. A block 103, secured to the valve by one or more screws 104, closes one end of the chamber 101, and is provided with a stem 105 guided in the abutment element 91. A block 107 may be secured in the opposite end of the valve by one or more screws 108 to close the end of the chamber 102, and is provided with a stem 109 guided in the abutment element 91'. Coiled springs 110 and 111 cooperate with the blocks and abutment elements to hold the valve resiliently in its neutral position, axially of the housing. Movement-limiting means, comprising a socket 113 similar to the socket 33, and a screw 116 having a nose 118 adapted to cooperate with said socket, will be provided.

In this form of the invention, the valve is provided with an enlarged inlet port 119 having a substantial axial extent and having a peripheral extent greater than the minimum peripheral distance between the inlet port 92 and either of the outlet ports 94 and 95, but less than the minimum distance between said outlet ports. The valve is formed with an exhaust port 120 which, when the valve is in its neutral position, registers with the housing exhaust port 93.

Opening from the chamber 101 are valve outlet ports 123 and 124, peripherally spaced from each other in an amount equivalent to the peripheral spacing between the housing outlet ports 94 and 95, and oppositely spaced, in the direction of the axis of the housing 90, from the housing outlet ports 94 and 95, respectively, when the valve is in its neutral position. The axial extent of the inlet port 119 is at least equal to the axial distance between the most remote portions of the ports 123 and 124.

Opening from the chamber 102 is a port 126 which, in the neutral position of the valve, is peripherally aligned with the housing port 96 but spaced therefrom, in the direction of the axis of the housing 90, by an amount equal to the spacing of the port 123 from the port 94. At a point peripherally and axially spaced from the port 126, a port 128 opens from the chamber 102, said port being peripherally aligned with, but axially spaced from, the port 96 when the valve is in its neutral position. A port 130 opens from the chamber 102 and is peripherally aligned with, but axially spaced from, the port 97 when the valve is in its neutral position, by an amount equivalent to the spacing of the port 124 from the port 95. A further port 132, peripherally aligned with the port 128, opens from the chamber 102 and is axially spaced from the port 98 when the valve is in its neutral position. The ports 128 and 132 are oppositely spaced from the port 98 by amounts corresponding to the spacing of the parts 124 and 123 from the ports 95 and 94.

Ports 133 and 135 open from the chamber 101 in peripheral alignment with the port 120, said ports being axially spaced from the port 120 in amounts equivalent to the spacing of the ports 124 and 123 from the ports 95 and 94, when the valve is in its neutral position. Threaded plugs 134 and 136 are removably seatable in the ports 133 and 135 to seal the same against fluid flow; and in order to provide access to said plugs, the housing is provided with openings 137 and 139 adapted to be closed by threaded plugs 138 and 140, respectively.

A conduit 146 leads from the port 94 to a branched fitting 147 having a check valve 148 therein, and a conduit 149 leads from said fitting 147 to a point of use.

Similarly, a conduit 151 leads from the port 95 to a fitting 152 embodying a check valve 153, and a conduit 154 leads from the fitting 152 to a point of use. A conduit 155 connects the fitting 152 with the port 96 and a conduit 156 connects the fitting 147 with the port 97.

A conduit 157 connects the exhaust port 93 with a branched fitting 158 embodying a check valve 159, and a conduit 160 leads from the fitting 158 to exhaust. A conduit 161 connects the port 98 with the fitting 158.

It will be clear that the port 119 registers with the port 92 in all permissible positions of the valve. When the valve mechanism is connected to a double acting motor like that illustrated at 61, the screw 116 will be sufficiently projected to prevent oscillation of the valve. If the valve is now shifted from its neutral position toward the left as viewed in Fig. 5, the port 120 will be moved out of registry with the port 93, the port 123 will register with the port 94, the port 126 will register with the port 96, and the 132 will register with the port 98. Fluid flow will then be into the chamber 101 through the ports 92 and 119, and thence through the ports 123 and 94 and the conduit 146, past the check valve 148 and through the conduit 149 to one end of the motor cylinder; and from the other end of the motor cylinder through the conduit 154, fitting 152, conduit 155, port 96, and port 126 into the chamber 102, and thence through ports 132 and 98, conduit 161, fitting 158, and exhaust conduit 160 back to the pump. Correspondingly, if the valve is shifted toward the right as viewed in Fig. 5, ports 124 and 95 will register, ports 130 and 97 will register, and ports 128 and 98 will register. Flow will then be from the chamber 101 through ports 124 and 95 and conduit 151, past check valve 153, and through fitting 152 and conduit 154 to one end of the fluid motor; and from the other end of the fluid motor, through conduit 149, fitting 147, conduit 156, ports 97 and 130 to chamber 102, and thence through ports 128 and 98, conduit 161, fitting 158, and exhaust conduit 160 to the pump.

If the control valve is to be connected to two single acting fluid motors, the screw 116 will be retracted to its illustrated position, and the plugs 134 and 136 will be removed. Now, if it is desired to supply fluid to one motor, the valve will be oscillated to bring the port 119 into a position in which it provides communication between the port 92 and the port 94. All other ports will then be out of registry, and fluid will flow through the conduit 149 to one motor. If the other motor is to be supplied, the valve will be rocked in the opposite direction to shift the port 119 into a position in which it provides communication between the port 92 and the port 95. All other ports being, at that time, out of registry, fluid will flow through the conduit 154 to the other motor. In order to exhaust the first-mentioned motor, the valve will be shifted to the right, as viewed in Fig. 5, whereby the port 124 will register with the port 95, the port 133 will register with the port 93, the port 130 will register with the port 97, and the port 128 will register with the port 98. Since fluid will be exhausted from the chamber 101 through the ports 133 and 93 as fast as it is supplied through the port 92, no fluid will flow through the ports 124 and 95 and past the check valve 153. Fluid will be exhausted from the first-mentioned motor, however, through the conduit 149, fitting 147, conduit 156, and ports 97 and 130 to the chamber 102 and thence, through ports 128 and 98, conduit 161, fitting 158, and exhaust conduit 160. To exhaust the second-mentioned cylinder, the valve is moved toward the left, as viewed in Fig. 5, to effect registration of the ports 123 and 94, 135, and 93, 126, and 96, and 132 and 98; whereby fluid may flow from the second-mentioned motor through conduit 154, fitting 152, conduit 155, ports 96 and 126, to chamber 102, and thence through ports 132 and 98, conduit 161, fitting 158, and exhaust conduit 160.

All of the description thus far has presupported an organization in which the fluid under pressure to be controlled is supplied by a continuously operating pump, so that such fluid must have some open flow path at all times. In Fig. 8, I have illustrated a construction whereby the valve of Figs. 5 to 7 may be adapted for use in a pressure-maintained system. In such a system, of course, fluid is held, under pressure, in a reservoir; and a pump is provided with suitable controls so that the pump operates intermittently to restore a predetermined pressure condition in the reservoir whenever the pressure within that reservoir falls below a predetermined minimum.

As shown in Fig. 8, the valve 99 illustrated in Figs. 5 to 7 may be provided with an outlet port 120', threaded or otherwise designed, for the reception of a suitable closure plug 162. With the plug 162 in place, the valve may be manipulated in the manner above described to control, selectively, a plurality of single acting fluid motors or a double acting fluid motor. Of course, the valve illustrated in Figs. 1 to 4 might be similarly modified to provide plugging means for the exhaust port 40.

It will be readily appreciated that, according to my invention, I have provided valve means which, by proper insertion or removal of the plugs such as 134, 136, and 162 may be adapted, simply and inexpensively, for use in almost any sort of fluid-motor-controlling organization.

I claim as my invention:

1. Valve mechanism comprising a cylinder housing provided with a radial inlet port, a radial exhaust port peripherally spaced from said inlet port, a first radial outlet port located peripherally between said inlet and exhaust ports, a second radial outlet port located peripherally between said inlet and exhaust ports, said outlet ports being on opposite sides of a plane including the axis of said housing and the axis of said inlet port, a fifth radial port and a sixth radial port peripherally spaced from each other and spaced in the direction of the axis of said housing from said inlet, exhaust, and outlet ports, and a second exhaust port spaced in the direction of the axis of said housing from all of said ports, a cylindrical valve received in said housing for axial reciprocation and oscillation relative thereto, said valve providing a first chamber and a second chamber spaced from said first chamber in the direction of the axis of said housing, means limiting reciprocation and oscillation of said valve, said valve being provided with port means opening from said first chamber and registering, in all permissible positions of said valve, with said housing inlet port and providing alternatively, upon opposite oscillation of said valve from a neutral position, communication between said housing inlet port and said housing outlet ports, said valve further having a first exhaust port opening from said first chamber and registering with said first-named housing exhaust port only when said valve is in its neutral position, said valve further having a first outlet port and a second outlet port opening radially from said first chamber, said valve outlet ports being oppositely spaced in the direction of the axis of said housing, but peripherally aligned with, said first and second housing outlet ports when said valve is in its neutral position, said valve having a fifth port and a sixth port opening from said second chamber, said last-named ports being peripherally aligned with, but oppositely spaced from said housing fifth and sixth ports, respectively, in the direction of the axis of said housing, by amounts corresponding to the spacing of said valve outlet ports from said housing outlet ports, when said valve is in its neutral position, and said valve having a second exhaust port and a third exhaust port opening from said second chamber and peripherally aligned with said second housing exhaust port but oppositely spaced therefrom, in the direction of the axis of said housing, by amounts corresponding to the spacing of said valve outlet ports from said housing outlet ports, when said valve is in neutral position.

2. The valve mechanism of claim 1 in which said valve is provided with two additional exhaust ports opening from said first chamber, said additional exhaust ports being peripherally aligned with said first-named housing exhaust port and oppositely spaced therefrom, in the direction of the axis of said housing, by amounts corresponding to the spacing of said valve outlet ports from said housing outlet ports, when said valve is in neutral position.

3. The valve mechanism of claim 2 including a plug removably seatable in each of said additional exhaust ports to seal the same against fluid passage therethrough.

4. The valve mechanism of claim 1 in which said valve port means comprises a single port having an axial extent greater than the axial spacing between said valve outlet ports and a peripheral extent greater than the minimum peripheral spacing between said housing inlet port and either of said housing outlet ports but less than the minimum peripheral spacing between said housing outlet ports.

5. The valve mechanism of claim 1 in which said valve port means comprises an inlet port having an axial extent greater than the axial spacing between said valve outlet ports and two outlet ports axially aligned with, but peripherally oppositely spaced from, said housing outlet ports when said valve is in neutral position.

6. The valve mechanism of claim 1 in which said valve port means comprises an inlet port having an axial extent at least equal to the reciprocating stroke of said valve, as defined by said limiting means, and two outlet ports axially aligned with, but peripherally oppositely spaced from, said housing outlet ports when said valve is in neutral position.

7. The valve mechanism of claim 1 in which said limiting means comprises a socket penetrating the cylindrical surface of said valve and having a branch elongated in the direction of the axis of said housing and a branch intersecting said first-named branch and elongated peripherally of said valve, and means held against any movement axially or peripherally relative to said housing and slidably engaging in said socket.

8. The valve mechanism of claim 7 in which said branches substantially bisect each other.

9. The valve mechanism of claim 7 in which said last-named means is a screw threadedly penetrating a radial opening in said housing.

10. The valve mechanism of claim 7 in which one of said branches is radially deeper than the other and in which said last-named means is adjustable radially of said housing.

11. The valve mechanism of claim 9 in which one of said branches is radially deeper than the other.

12 The valve mechanism of claim 1 including a removable plug removably associable with said first exhaust port of said valve to seal the same against fluid flow therethrough.

WALTER L. HARBAUGH.

REFERENCES CITED

The following references are of record in the file of this patent:

UNITED STATES PATENTS

| Number | Name | Date |
|---|---|---|
| 1,935,119 | Guild | Nov. 14, 1933 |
| 2,362,944 | Stephens | Nov. 14, 1944 |

FOREIGN PATENTS

| Number | Country | Date |
|---|---|---|
| 517,467 | Great Britain | of 1940 |